(12) United States Patent
Hartman

(10) Patent No.: US 6,236,409 B1
(45) Date of Patent: May 22, 2001

(54) METHOD AND APPARATUS FOR COMPUTER AIDED BUILDING SPECIFICATION GENERATION

(75) Inventor: Linda Marie Hartman, Hyattsville, MD (US)

(73) Assignee: The Construction Specification Institute, Alexandria, VA (US)

( * ) Notice: Subject to any disclaimer, the term of this patent is extended or adjusted under 35 U.S.C. 154(b) by 0 days.

(21) Appl. No.: 09/102,580

(22) Filed: Jun. 23, 1998

Related U.S. Application Data
(60) Provisional application No. 60/050,538, filed on Jun. 23, 1997.

(51) Int. Cl.[7] ................................................. G06T 11/60
(52) U.S. Cl. ........................... 345/435; 700/97; 700/108; 705/29; 707/104
(58) Field of Search ................................. 345/435, 420; 705/29, 34; 707/1–10, 100–104; 709/217, 218, 249; 700/97–107

(56) References Cited

U.S. PATENT DOCUMENTS

| 4,370,707 | 1/1983 | Phillips et al. . | |
|---|---|---|---|
| 4,700,318 | * 10/1987 | Ockman | 364/518 |
| 4,875,162 | 10/1989 | Ferriter et al. | 364/401 |
| 4,964,060 | 10/1990 | Hartsog . | |
| 5,109,337 | 4/1992 | Ferriter et al. . | |
| 5,260,883 | 11/1993 | Wilson . | |
| 5,280,425 | 1/1994 | Hogge . | |
| 5,303,144 | 4/1994 | Kawashima et al. . | |
| 5,303,147 | * 4/1994 | Oba et al. | 364/402 |
| 5,357,400 | * 10/1994 | Talbott et al. | 364/467 |
| 5,357,440 | 10/1994 | Talbott et al. . | |
| 5,446,842 | * 8/1995 | Scheaffer et al. | 395/200.01 |
| 5,493,490 | 2/1996 | Johnson . | |
| 5,526,520 | * 6/1996 | Krause | 395/600 |
| 5,579,519 | 11/1996 | Pelletier . | |
| 5,615,342 | * 3/1997 | Johnson | 395/227 |
| 5,625,776 | 4/1997 | Johnson . | |
| 5,689,705 | * 11/1997 | Fino et al. | 395/617 |
| 5,692,206 | 11/1997 | Shirley et al. . | |
| 5,740,425 | 4/1998 | Povilus | 395/611 |
| 5,745,878 | 4/1998 | Hashimoto et al. . | |
| 5,761,674 | * 6/1998 | Ito | 707/104 |
| 5,907,704 | * 5/1999 | Gudmundson et al. | 395/701 |

OTHER PUBLICATIONS

"Automated Specifications A Research Survey"; The Construction Specification Institute 1717 Mass. Avenue, N.W., Washington, D.C. 20036; Nov. 1967.

(List continued on next page.)

Primary Examiner—Matthew Luu
Assistant Examiner—G. F. Cunningham
(74) Attorney, Agent, or Firm—Kenyon & Kenyon

(57) ABSTRACT

A method and apparatus for producing a design document for a product, with the product having product elements arranged in a hierarchical manner and stored in a relational database, is described. A selection is received for at least one product element. At least one performance value associated with the selected product element is received. A text segment associated with each selected product element is retrieved from the database. Selected text segments are then used to construct the design document.

27 Claims, 7 Drawing Sheets

OTHER PUBLICATIONS

"BSD Specification Management for the Microsoft Window Environment User Manual"; 1997.

"Computer–Integrated Design Drawings and Construction Project Plans" by M.K. Parfitt, et al., Journal of Construction Engineering and Management, vol. 119, No. 4, Dec. 1993.

"JSpace . . . an environment for objects": JT Jacobus Technology, Inc.;ENR/Aug. 30, 1993.

"Integrated Drawings and Specs Goal of AIA and Softdesk ASG Venture"; Published quarterly by AIA Master Systems, a division of The American Institute of Architects; 1993.

"Making the Link"; by Robert Paul Dean and Miriam S. Eldar: The Construction Specifier/Jan., 1994.

"The Integrated" by Charles A. Shrive; The Construction Specifier/Nov., 1995.

A Virtual Design Studio: Today's Opportunity for Effective Creativity; by Eugene Sulek; Design Management Journal/Summer 1994.

"Booming Bits Begets Naibiters, The Internet is a Place to Be But Where's the Mony?"; ENR/Oct. 28, 1996.

"Specification: The Stanford Report"; by William Lohmann; 1992.

"Specification Automaction for Small Projects, Small Firms"; by Mark Kalin; A/E/C Systems Computer Solutions/Sep.–Oct. 1996.

"Job Site Information Systems Bringing the Office to the Field"; by Criag Savage; A/E/C Systems Computer Solutions/Sep.–Oct. 1996.

"The Internet Gold Rush Isn't Just Fool's Gold," ENR/Oct. 28, 1996.

"Construction Paperwork Integrates with a Click," ENR/Oct. 28, 1996.

A letter by Charles A. Shrive date Apr. 23, 1998.

A memo by Charlie Shrive regarding a proposed design/build document program, dated Aug. 9, 1995.

A document entitled "Petition to the Construction Specification Institute Regearding a proposed Effort with the Design–Build Institute of America," on behalf of Enguistics, including Vernon Carlton Bryant, Linda E. Brown and Charles A. Shrive, dated Sep. 7, 1995.

An electronic mail message from Charles Shrive Dated Sep. 20, 1995.

A document titled "A Proposal for a Design/Build Document Program as a joint effort of the Design–Build Institute of America and the Construction Specification Institute," dated Oct. 16, 1998.

A document dated Oct. 25, 1995, regarding a draft Request for Proposal (RFP).

A first set of meeting notes dated Jan. 4, 1996.

A second set of meeting notes dated Jan. 4, 1996.

A document by Kenneth C. Guthrie dated Feb. 6, 1996.

A presentation to CSI by Robert Paul Dean dated Sep. 13, 1993.

* cited by examiner

METHOD AND APPARATUS FOR COMPUTER AIDED BUILDING SPECIFICATION GENERATION

CROSS-REFERENCES TO RELATED APPLICATIONS

This application claims the benefit of U.S. Provisional Application No. 60/050,538 titled "Method and Apparatus For Computer Aided Specification Generation" and filed on Jun. 23, 1997.

FIELD OF INVENTION

The invention relates generally to design systems. More specifically, the invention relates to design systems for the creation of product design documents.

BACKGROUND OF THE INVENTION

A planning process which involves multiple entities can be difficult to manage and coordinate, especially if there are one or more documents being passed between parties during the course of the process. This is the case with the construction and building industry. The planning which is required prior to the construction of a modern building is a labor intensive exercise, segments of which may be repeated several times during the process. When a prospective owner desires to build a building, using a design-builder delivery system, the owner's agents produce a request for proposal. The request for proposal (RFP) document which is distributed to potential design-builders includes the performance requirements for the building and the requirements for submitting a proposal.

A design-builder entity then distributes the RFP to a design team of architects and engineers and a builder team. The design team is typically responsible for designing the building in sufficient detail to begin actual construction of the building. These design details are embodied in construction drawings and specifications. The details for the building include specific features, materials, products, systems, schematic diagrams, and so forth. Using this design specification, the builder team may produce a financial document estimating the cost of the project and a construction schedule. At this point, if financial projections exceed the allocated budget, another iteration of the design may occur in an attempt to produce a design-builder proposal which is financially commensurate with the RFP. When the financial document and the design specification are satisfactory to the design-builder entity, the documents are combined into a design-builder entity proposal which is submitted to the prospective owner.

At this point the agents of the owner compare the design-builder proposal with the RFP and based upon the findings of the design teams, a decision is made as how to proceed. The decision at this point may be not to proceed, to issue another RFP, to negotiate specific changes in the proposal or to accept the design-builder proposal. Thus at several stages in the planning, many segments of the planning may be redone multiple times in an attempt to meet certain constraints.

In an attempt to reduce the amount of work required for this labor intensive process several systems have been developed which attempt to automate segments of the planning process. For example, Computer Aided Design (CAD) programs reduce the time required to create or change the schematic designs, while specification and estimator programs reduce the time necessary to create or change the textual portions of the proposal based upon the materials specified by the designers.

In view of the foregoing, it can be appreciated that a substantial need exists for a method and apparatus which solves the above-discussed problems, more specifically, to more efficiently allow multiple entities to work together while passing one or more documents between the entities.

SUMMARY OF THE INVENTION

One embodiment of the invention includes a method and apparatus for producing a design document for a product, with the product having product elements. Data representing the product elements can be arranged in a hierarchical manner and stored in a relational database. In producing the design document, a selection is received for at least one product element. At least one performance value associated with the selected product element is received. A text segment associated with each selected product element is retrieved from the database. Selected text segments are then used to construct the design document.

In another embodiment of the invention, a first entity (e.g., an owner entity) constructs a first overlay for the design document using a first design-build device. An overlay is a template for the relational database. The first overlay is sent to a second design-build device. A second overlay for the design document is received from the second device. The second overlay includes the first overlay and any modifications made to the design document by a second entity (e.g., a design-build entity). A first and second set of data from the database corresponding to the first and second overlays, respectively, are retrieved and displayed for review by the first entity. The first or second entity can then create a third overlay including the first and second overlays and any further modifications for the design document, and send the third overlay to a third design-build device for review by a third entity (e.g., a materials supplier).

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
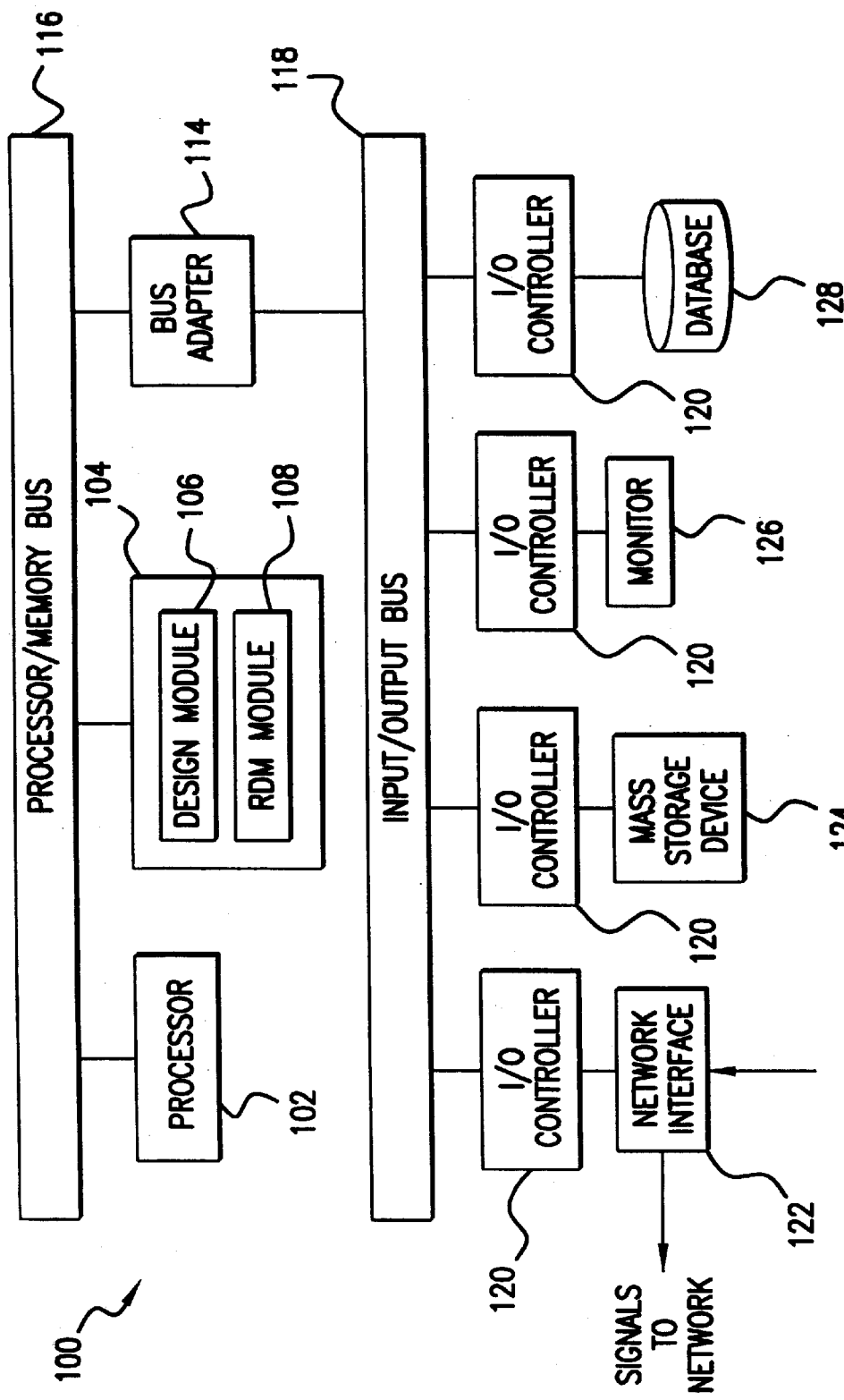
FIG. 1 is a block diagram of a design-build system in accordance with one embodiment of the invention.

One embodiment of the invention comprises a method and apparatus for producing design documents in accordance with a particular industry, such as the construction industry, aerospace industry, automotive industry, computer and telecommunications industry, and so forth. For illustrative purposes only, this embodiment of the invention will be described in terms of the construction industry. The term "construction industry" refers to the industries whose chief businesses are the design, demolition, construction, reconstruction, life-cycle management, or renovation of buildings; the infrastructure serving buildings; and transportation and utility infrastructures. The structures produced or designed in the construction industry may be land-based, marine based, or space-based. Building types referenced under the definition of "buildings" include: General Buildings (e.g., buildings constructed to house commercial, educational, and medical activities, offices, stores, hotels, and housing of all types); Manufacturing Facilities (e.g., buildings constructed to house manufacturing or assembly of automobiles, textiles, electronics, etc.); Transportation Facilities (e.g., buildings required for the functioning of transportation systems, such as airports and train stations); Industrial Processing Facilities (e.g., buildings constructed to house pulp and paper, steel and other metal production operations, metal refineries, chemical, pharmaceutical, and food and other processing plants, etc.); Non-vehicular Space Facilities (e.g., facilities constructed primarily to house persons living and working in space, to enable the exploitation of extraterrestrial resources, and to house extraterrestrial manufacturing operations, etc.). Infrastructure types referenced under the definition of infrastructure serving buildings include electrical power and communication lines, water and waste lines, gas and other utility lines. Transportation and Utility Infrastructures include: Ground and Underground Transportation Infrastructure (e.g., roads, bridges, railroads, tunnels, over- and under-passes, etc.); Power Production and Transmission Infrastructure (e.g., thermal and hydroelectric power plants, waste-to-energy and co-generation plants, and auxiliary substations, transformers, transmission lines, etc.); Water Supply Infrastructure (e.g., dams, reservoirs, pumping stations, distribution pipelines, irrigation canals, desalination and potability treatment plants, etc.); Sewerage/Solid Waste Management Infrastructure (e.g., sanitary and storm sewers, treatment plants, pumping stations, incinerators, industrial waste facilities, etc.); Hazardous Waste Treatment/Abatement Facilities (e.g., facilities for the storage, containment, and/or detoxification of asbestos- and lead-contaminated waste, chemical and nuclear contaminants, etc.); Waterways and Marine Infrastructure (e.g., canals, locks, marine dredging facilities, piers, sea-based oil rigs, ship-building facilities, etc.); and Mining and Refineries (e.g., underground and strip-mining facilities, petrochemical plants, petroleum refineries, offshore mining or drilling facilities and auxiliary pipelines. Although this embodiment of the invention is described with reference to the construction industry, however, it can be appreciated that the principles and concepts outlined in terms of the construction industry may be equally applied to other industries and still fall within the scope of the invention.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One embodiment of the invention comprises a system that enables a first entity (e.g., prospective owner) to produce an RFP that describes building facility requirements in performance terms for design-build or other construction projects ("design-build system"). The design-build system then permits a second entity (e.g., design-builder) to generate a design-builder proposal based upon the RFP. In other words, the proposal is generated using the performance-based description or specification of the proposed building and its requisite site work. In addition, the system permits the design-builder entity, the prospective owner, or other contractor to generate performance specifications for use by a construction team.

Referring now in detail to the drawings wherein like parts are designated by like reference numerals throughout, there is illustrated in FIG. 1 a design-build system in accordance with one embodiment of the invention. As shown in FIG. 1, a design-build system 100 comprises a processor 102, a memory 104, and a bus adapter 114, each of which is connected to a processor/memory bus 116 and an Input/Output (I/O) bus 118 via bus adapter 114. Further, design build system 100 contains a network interface 122, mass storage device 124, monitor 126, and database 128, each of which is connected to I/O bus 118 via an I/O controller 120.

In this embodiment of the invention, design-build system 100 is a microprocessor-based personal computer (PC) system. Memory 104 may be any suitable computer readable memory device such as one or more dynamic random access memory (DRAM) devices. Mass storage device 124 may be any suitable computer-readable storage means for storing digital signals such as magnetic storage media (i.e., a magnetic disk), optical storage media (i.e., a CD-ROM or Digital Video Disc), and so forth. Further, design-build system 100 may contain various combinations of machine readable storage devices through other I/O controllers, which are accessible by processor 102 and which are capable of storing digital signals. Network interface 122 may be any suitable means for controlling communication signals between network devices using a desired set of protocols, services and operating procedures. Those skilled in the art will understand that the communication signals may be received over any suitable medium such as twisted-pair wire, co-axial cable, fiber optics, radio-frequencies, and so forth. Processor 102 may be any suitable means for performing the functionality for various embodiments of the invention, and is preferably a general purpose microprocessor such as the Pentium®, Pentium Pro, or Pentium II made by Intel Corporation. Monitor 126 may be any means for displaying analog signals, such as a variable graphics array (VGA) monitor. I/O controllers 120 may be any means for controlling the flow of information between I/O bus 118 and various I/O devices such as network interface 122, mass storage device 124, monitor 126 and database 128. Bus adapter 114 may be any means suitable for transferring data back and forth between processor/memory bus 116 and I/O bus 118. Design system 100 is non-operating system dependent and in one embodiment functions with Windows 3.1, 3.11, Windows 95, or Windows NT.

Memory 104 stores computer program segments that a processor (e.g., processor 102) executes to perform the functionality for this embodiment of the invention. These computer program segments are separated into two modules, that is, a design module 106 and a relational database management (RDM) module 108. It can be appreciated, however, that the functions performed by these modules can be further separated into more modules, combined together to form one module, or be distributed throughout the system, and still fall within the scope of the invention. Further, although this embodiment of the invention implements the functionality of these modules in software, it can be appreciated that the functionality of these modules may be implemented in hardware, software, or a combination of hardware and software, using well-known signal processing techniques. The operation of these modules will be described in further detail later with reference to FIG. 3.

In this embodiment of the invention, database 128 is a relational database storing data in hierarchical form. The data is extracted from database 128 by relational database management module 108. Design module 106 is used to organize data from the database into various design documents and overlays consistent with one or more performance terms.

Database 128 is a relational database storing information in a hierarchical format. Individual "cells" of information are stored in the database, with each cell being connected to other related cells (e.g., peer cells, child cells and parent cells) by a link or pointer. The information within a cell and its links varies according to a particular product or system that is being designed. The product is broken down into separate components, with the components being broken down into separate elements, and so forth in a hierarchical manner to whatever level of granularity is desired. Each discrete part of the product is uniquely identified, and is referred to herein as a "product element." Each product element is stored in an individual cell used by database 128. An example will be described with reference to FIG. 2.

Figure 2:
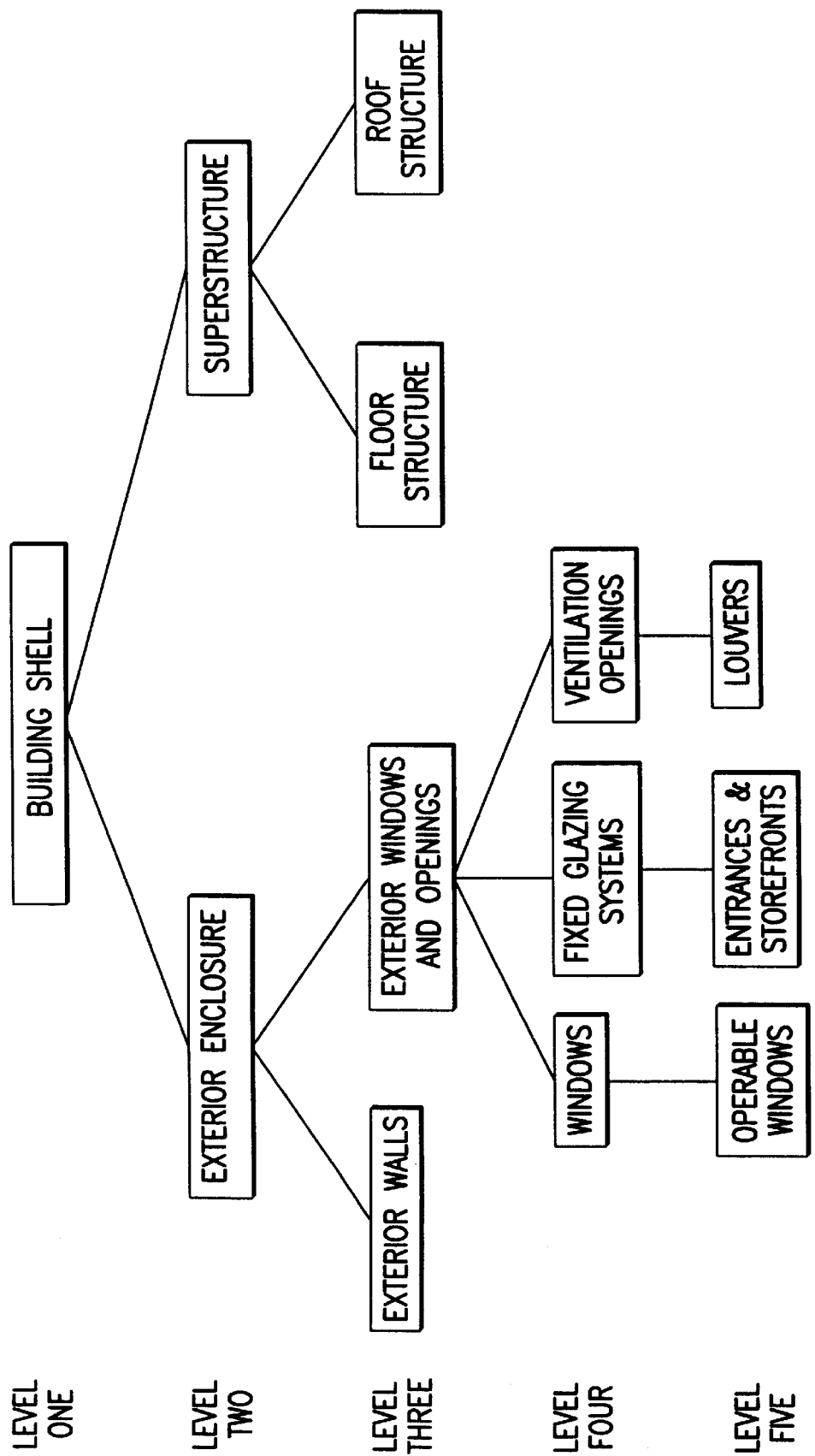
FIG. 2 illustrates a hierarchical model suitable for use with one embodiment of the invention.

FIG. 2 illustrates a hierarchical model suitable for use with one embodiment of the invention. One example of a product that may be broken down into its product elements and organized into a hierarchical structure is a building. A building can be defined according to major construction assemblies which are arranged as a hierarchical relational list of building assembly descriptions of increasing specificity. At the highest level of the list is a facility description in substantially the broadest performance terms possible. Thus at the top of the hierarchy (Level One) is an element by element list of the major assemblies of all buildings, such as shell, services, interiors, and equipment and furnishings. The next level (Level Two), in one embodiment, describes systems within an assembly, as shown in FIG. 2. Thus the building shell element is described in terms of exterior enclosure and superstructure elements. Level Three of specificity describes different sub-systems of each system, for example, exterior walls, and exterior windows and other openings. Below this level (Level Four), the data include specific components such as windows, fixed glazing and ventilation openings. Finally, at the lowest level in this embodiment (Level Five), building elements such as operable windows, entrances and storefronts, and louvers, are included. In each case, the elements are described in terms of their performance.

In this embodiment of the invention, a building is decomposed into various product elements in a manner similar to an industry standard format promulgated by the Construction Specifications Institute (CSI) and Constructions Specifications Canada (CSC) and referred to as the CSI/CSC 1997 Draft UniFormat ("UniFormat"). It is worthy to note that although UniFormat was used to define product elements in this embodiment of the invention, any hierarchical definition of product elements can be used and still fall within the scope of the invention, such as the CSI/CSC 1998 version of UniFormat.

Each cell can contain many types of information or attributes to characterize a product element, such as a performance value, text segment, identifier, and so on. A performance value may be a qualitative or quantitative parameter. Examples of qualitative parameters might be that the building must conform to certain architectural requirements for a particular area, have a non-combustible outer shell, or that each product element must be aesthetically consistent with a brick facade. Examples of quantitative parameters might be an overall seismic resistance of the building, a value for thermal resistance for an exterior wall, a value for glass transmittance, and so forth. A text segment is defined as one or more words, phrases, or sentences which can be combined together to produce a particular document. In this embodiment of the invention, the text segments describe a building's technical requirements and, along with the performance values, are used to produce performance-based specifications for the building's systems and elements.

The organization of product elements in a hierarchical manner serves at least two purposes. First, it creates a standard format and terminology that can be used to enhance communications between multiple entities. Second, it permits an entity to define a product in performance terms, thereby permitting multiple entities to build upon each other's work in a consistent and uniform manner. Both purposes will become more apparent during the description of the operation of design-build system 100, which occurs in the following sections.

Figure 3:
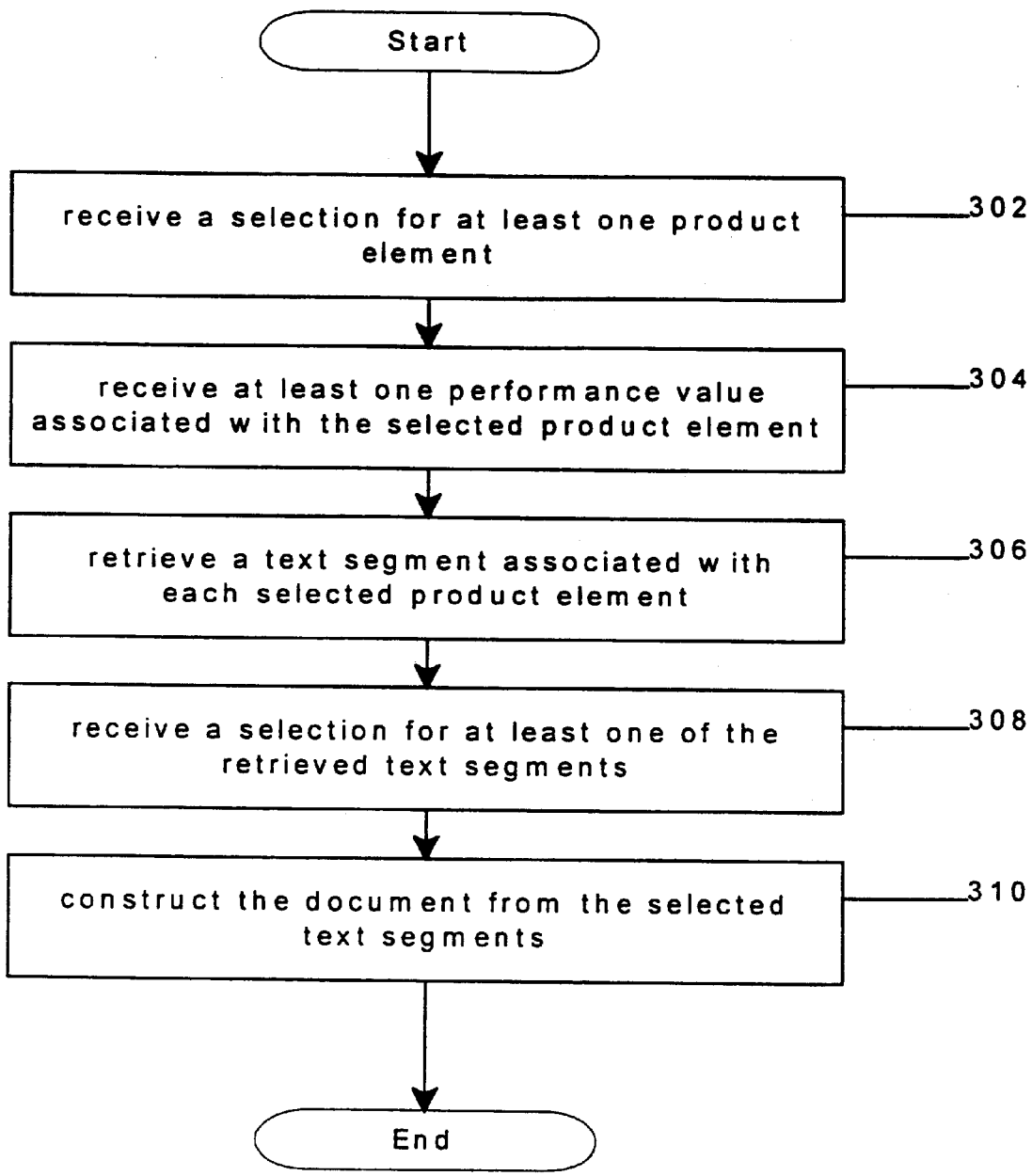
FIG. 3 is a block flow diagram of the steps performed by a design-build system in accordance with one embodiment of the invention.

FIG. 3 is a block flow diagram of the steps performed by a design-build system in accordance with one embodiment of the invention. Design-build system 100 is capable of producing a design document for a product, with the product having product elements arranged in a hierarchical manner. System 100 receives a selection for at least one product element at step 302. System 100 also receives at least one performance value associated with the selected product element at step 304. System 100 then retrieves a text segment associated with each selected product element at step 306. A user selects which of the retrieved text segments are to be incorporated into the document at step 308. System 100 constructs the document using the selected text segments at step 310.

Referring again to the building industry, design-build system 100 permits a prospective owner to utilize the least detailed level of performance requirements compatible with the owner's needs. Thus for an advantageous design-build project, performance requirements of the RFP are described at the highest level. A prospective owner needing a greater degree of control over the finished product might describe needs at a higher level of specificity. Such an arrangement of the database enables the design-builder to improve upon the work of the owner and describe the proposed design solution in greater detail than the owner used to describe the requirements, still in performance terms, by drawing upon data from an appropriate level of the database. If the prospective owner's requirements statement is produced at the most detailed level available in the database, the design-builder may then produce a proposal in prescriptive terms.

Design-build system 100 permits different levels of specificity to be used to describe different parts of the building project. For example, a prospective owner may stipulate very general performance requirements for an element, for example a substructure, in combination with very detailed requirements for some other building components, for example particular interior finishes.

A user of the system produces a product description by choosing from the product elements offered from the database, and occasionally by adding to them. By selecting the desired elements, paragraphs of text describing the elements are accessed from the database. This text may then be edited as desired. Relational links between the elements, and hence among paragraphs of text are arranged to discourage incompatible choices or automatically include collateral requirements once basic decisions are made. Selectable system parameters allow the user to make global choices among printed-page formats and other features, such as units of measure and have those choices propagated through the document. Associated with each option are help screens to accompany complicated text to be selected. In addition, the system is configured to permit evaluation of a proposal's solutions by performing an automatic comparison of the requirements at the present level with the requirements at a higher level.

In operation, to prepare a project document, the user first selects a project or starts a new project. From the project window, a table of contents is displayed and is organized by "volumes," which correspond to the assemblies of the product, general information about the project, and contractual information. The user can thus determine at a glance what assemblies have been included in the project. From this window, the user selects additional chapters to be included in the project. By selecting, for example by using a mouse, a chapter number or title, the data set level corresponding to the selected chapter is opened.

Text from the database is retrieved and can be scrolled and viewed like any document. However, in one embodiment, the text is not displayed like a document in a normal word processing environment. In this embodiment, each paragraph is in a text cell, similar to a spreadsheet, except that the text cell occupies most of the screen width. In this embodiment, and referring to the figures, the text hierarchy for each paragraph occupies a cell at the left edge of the screen. The current status of each paragraph is displayed, indicating whether it will be printed in the final document or not. Text that the user has selected is marked with an X. In addition, color coding of the text indicates how the text in the cell relates to other text in the document. In one embodiment, text that has been selected by the system is marked with a green box; text that is suggested as relevant by the system is marked with a yellow box; text that has been excluded by the system is marked with a red box; text that the user has excluded has half the status box blacked out.

Unlike documents from a typical word processing environment, chapters and projects in the present system feature "intelligent text." In order to create an edited document, the user selects text from the database and as the user makes text selections, the program automatically makes other changes to the chapter and to other chapters in the project as would occur in a spreadsheet rather than a word-processing environment. Only valid active text, selected by the user or included automatically by the program, will be assembled into the final output. To be active, selected text must have an unbroken line of parentage originating with the chapter title. This means that any "orphaned" text, text whose pointers can not be retraced to the origin, will not be part of the final printed document.

From a main File menu, the user opens a Summary Information dialogue box. Here the user is able to make a number of global decisions that will affect how the document is formatted. The user is able to establish the units of measure to be used, the terms to be used for key entities, and other variables. The data in the database includes certain associated information in order for these global variables to function as desired. For example:

| VARIABLE | EXAMPLE |
| --- | --- |
| Document function | RFP, Proposal or Instructions |
| Unit of measure | English or metric |
| Owner term | "owner" or "government" |
| Design-builder term | name of the design builder |
| Design professional term | name of |
| Contractor term | name of contractor |
| Project location (State) | state |
| Edition date (of standard) | \|date\| |

The switch "Document Function" permits the user to be able to define the function of the document once, changing all relevant language to reflect that function. In one embodiment, the values for the three functions are: Request for Proposal, Design-builder's Proposal, or Instructions for Construction. By selecting one of these values, the relevant language will be inserted globally into the text of the RFP or the proposal by the software.

The switch in the project summary dialogue box will set the appropriate option by selecting option 1, 2, or 3, designating whether the document is to serve as an RFP or a proposal or instructions for construction. Samples of alternative language are as follows:

For an RFP: "Design and select materials to provide"

For a proposal: "Construction will provide"

If instructions for sub-contractor: "Provide"

User options and global settings have been coded in the sample text the same way they would need to be coded for conversion by the content provider. Below are additional coding conventions that are used within the sample:

Owner's Criteria Documents: Comply with applicable requirements of the following:

1. BOCA National --and <<Building Code>> <<Fire Prevention Code>> <<Energy Conservation Code>> <<[__]>>---.
2. ICBO Uniform --and <<Building Code>> <<Fire Code>> <<[__]>>---
3. SBCCI Standard --and <<Building Code>> <<Fire Prevention Code>> <<Existing Building Code>> <<[__]>>---.
4. CABO Model Energy Code.
5. [__].
6. [__].

Within the database, a given paragraph (source paragraph) may be relationally linked to any number of other paragraphs (target paragraphs) both within the chapter and in other chapters. Only one link may exist from any source paragraph to a given target paragraph, but any paragraph may be the target of any number of links from multiple source paragraphs. Also, the links act in one direction only and do not result in reciprocal linkage. For example, a paragraph that automatically selects another paragraph will not be selected automatically if the target selection is chosen first; a separate link acting in the opposite direction would be necessary. In addition, the target paragraph may act on the first paragraph in a different way altogether, or not at all.

The presence of the type of link determines whether text is selectively excluded or flagged as pertinent. Because a given target paragraph may be acted upon by several links of different types (from a number of source paragraphs), the text status and related display modes are governed by a hierarchy of consequences resulting from a selection. Specifically:

1. Any text may be selected manually at any time, which overrides any links.
2. Any text may be excluded manually at any time, which also overrides any links.
3. If not selected or excluded manually but acted upon by one or more links of the same type, the status will correspond to that associated with the link type: (Yes, No, or flagged as pertinent).
4. If not selected or excluded manually but acted upon by more than one type of link, text status will be determined by the following hierarchy, from most to least controlling: (No, Yes, flagged as pertinent).
5. If not selected, excluded, or acted upon by any links, the text will be available for selection by the user.

Thus, a single "No" link will override any number of "Yes" or flagged links and a single "Yes" link will override any number of flagged links. Also, because status of a particular paragraph is dependent upon the net effect of all currently active links, removal of a particular link by deselection of the source text may result in a change in the status of the target paragraph. The software calculates the current status of each paragraph after each change in status of any paragraph and displays the active paragraphs on a white background for ease of identification.

The data format (in one embodiment CSI's UniFormat as adapted) accommodates virtually any type of building. In one embodiment, the content for a North American commercial project in a temperate or tropical climate, includes the International Conference of Building Officials (ICBO), Building Officials and Code Administrators International, Inc. (BOCA), or Southern Building Code Congress International, Inc. (SBCCI) model building codes either as regulatory requirements or incorporated by reference into the requirements. This code assumption provides a body of basic performance requirements which does not need to be repeated in the database. In other embodiments Canadian and major State codes are included.

The first display screen of the database is arranged as a series of "tabs" denoting major document volumes. The volumes start with 0 for Project information; tab A through G for the major building and site elements; tab X, referred to as volume X, which includes product information organized into 16 divisions, and a final tab Z, which includes contract information. In one embodiment the Master Format of the Construction Specification Institute is used to organize the contents of volume X. The hierarchical levels are referred to as assemblies (Level 1), systems (Level 2), subsystems (Level 3), and components (Level 4). Within each volume are chapters that may be used as separate documents. That is, chapter 0 contains the overall project description and the most fundamental performance requirements. Volumes A–G and 0 correspond to Level 1.

The first chapter in each volume contains the requirements that need to be defined at the assembly level. A requirement is defined at the volume or assembly level if the requirement can be stated as "All_[a] must be [b]_" or "No _[a]—may be _[b]_" where [a] is the name of the volume and [b] is the requirement. For example, if the entire shell of the building must be non-combustible, that would be stated at the assembly level in [b], assuming that a reference to the building code in volume 0 did not accomplish the same purpose.

If the requirement is such that not all of [a] is governed by the same requirement, but [a] can be divided into sections of the same type for which [b] is always the same, the requirement is still stated at the assembly level. For example, if one building in the project must have a completely non-combustible shell, but another need not have, such a requirement is stated at the assembly level. However, if as is more likely, the parts of [a] that are different are actually the systems within the assembly, the requirement should be stated at the system level. For example, the superstructure may need to be non-combustible but the exterior enclosure may not need to be. In that case, the requirement for each system would be stated at the system level under the system title. The initial chapter in each volume is titled the same as the volume and is organized into performance; products (acceptable and unacceptable); and methods of construction (acceptable and unacceptable).

For each sub-system (Level 3) heading there is a location in which subsystem and component level requirements are stated. The same principles apply as described for assembly and system level requirements. Thus each subsystem chapter is titled with the subsystem name and is organized in a similar manner: performance; products, and methods of construction. The system organizes segments of text by viewing levels and allow the user to view a level of detail.

In the system one or more statements of requirements is necessary for each element of the building and site. The requirements include the owner's definition of the building and the substantiation is whatever the owner wishes to receive showing that the proposal meets the requirements. An appropriate statement of acceptable substantiation is necessary for each requirement. Depending on the element, the requirements may be stated in performance terms or prescriptive terms or a combination of both. The substantiation can range from nothing at all to very detailed documentation, and submission of it may be specific to occur at the proposal stage, the design stage, or the construction stage. In addition, the user of the system is able to omit all substantiation statements and still be able to produce a contract document that can be enforced at the construction stage.

For many intangible requirements, it is not only difficult to determine what is an adequate performance requirement but identifying a practical method of substantiation may be almost impossible. In such a case, prescriptive requirements are stated giving a range of options from which the design-builder can choose or listing options that are not acceptable. Some examples of such substantiation include but are not limited to: (1) a statement by the design-builder that the design will comply with the requirements (which is usually incorporated into the terms of the proposal); (2) a statement that acceptance by the owner of alternative proposed products is indicated by incorporating the proposal into the contract documents; (3) a submittal of manufacturer's product literature or samples; (4) a submittal of certifications based on factory testing; and (5) a submittal of a manufacturer warranty.

Figure 4:
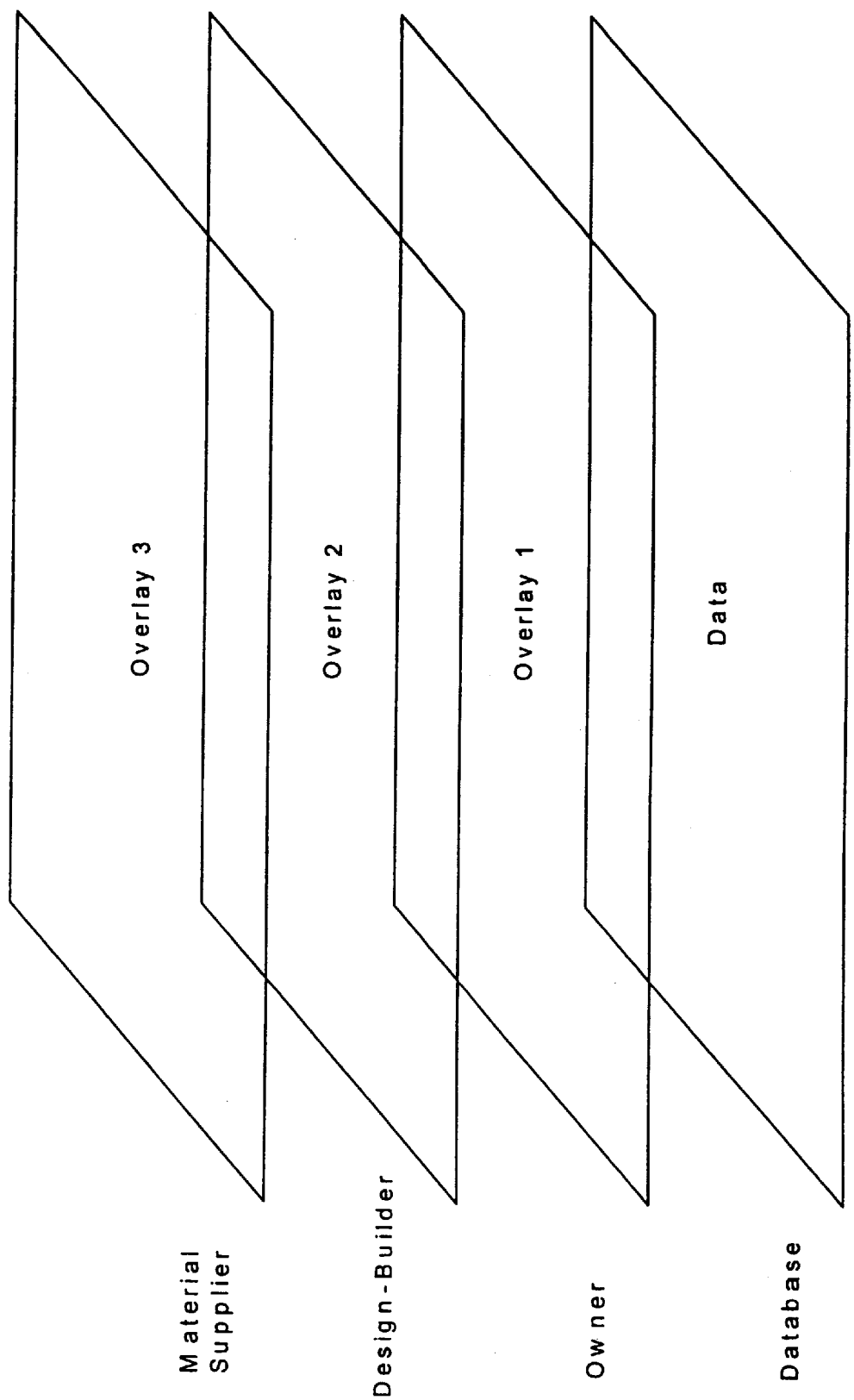
FIG. 4 illustrates various overlays in accordance with one embodiment of the invention.

FIG. 4 illustrates various overlays in accordance with one embodiment of the invention. Database 128 stores information in a hierarchical relational manner. Once a user has utilized system 100 to produce a new design document, that is, has selected the product elements and performance values to his or her desired level of granularity, reference information for the new document is stored in an electronic project file ("overlay"). By storing reference information for the new design document, rather then the actual design or product data, the size of the electronic file is reduced. This means that the amount of bandwidth required to transfer the new document is reduced. In this embodiment of the invention, the reference information for each overlay includes a series of codes and pointers that RDM module 108 can use to extract actual data for the design document from database 128. In other words, an overlay operates as a template for an underlying database.

Thus, each overlay can be sent in electronic form between entities involved in the design process, such as the owner entity, design-build entity and materials supplier entity. As long as each entity utilizes design system 100, each entity can access the appropriate data set from database 128 using the overlay. This minimizes the amount of data necessary for transmission between entity devices, while maintaining the capability of multiple entities to contribute to the design process by modifying the overlay appropriately.

Figure 5:
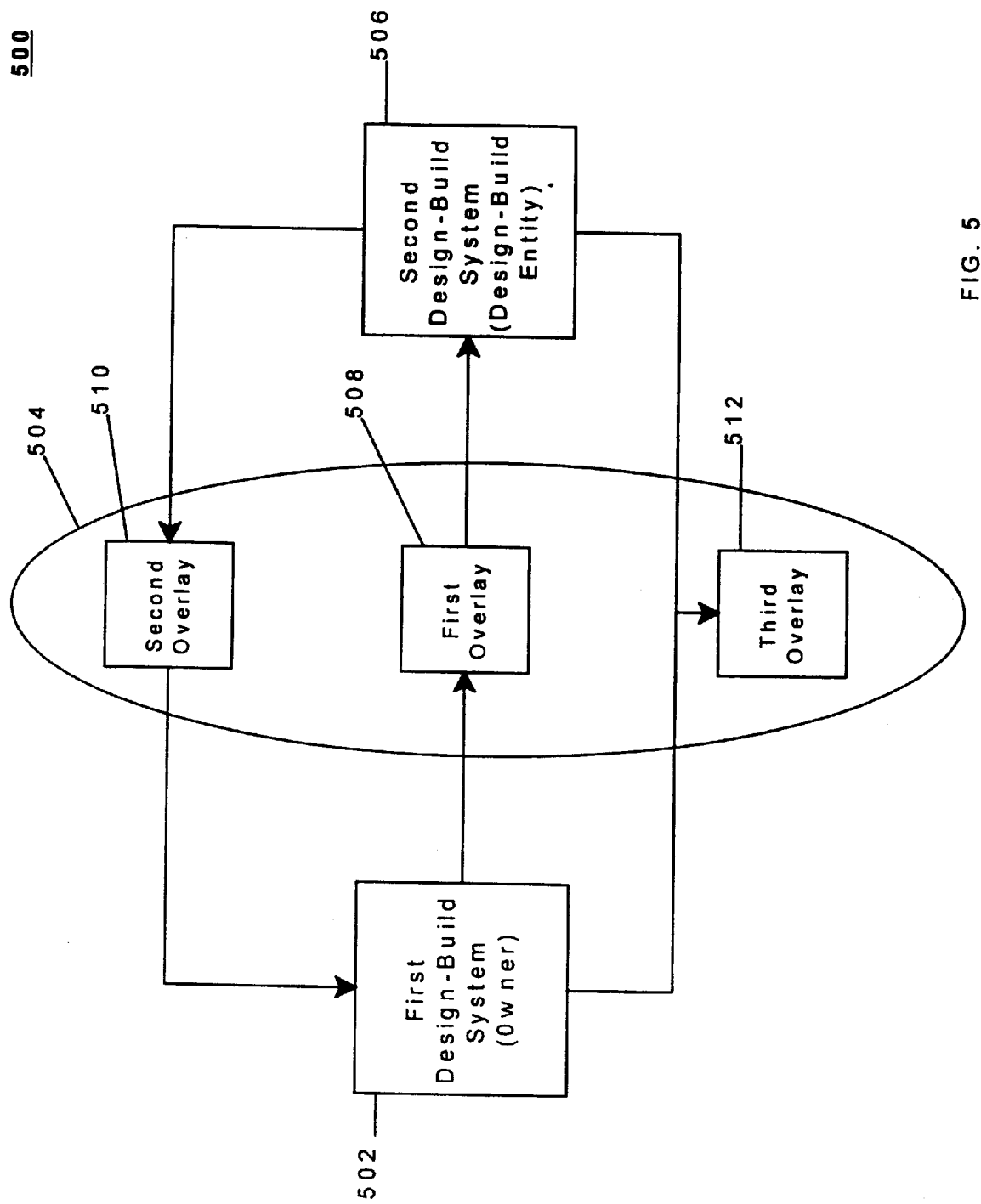
FIG. 5 is a block diagram of a design system in accordance with one embodiment of the invention.

FIG. 5 is a block diagram of a design system in accordance with one embodiment of the invention. FIG. 5 illustrates a design system 500 comprising a first design-build system 502, a second design-build system 506, and a network 504 connecting systems 502 and 506. Design-build systems 502 and 506 are similar to design-build system 100. Network 504 can be any network suitable for transferring data, such as a packet-switched network operating in accordance with a transport control protocol/internet protocol (TCP/IP).

Systems 502 and 506 pass a project overlay between them, with a first overlay 508 representing the owner's performance requirements for a building (e.g., RFP), a second overlay 510 representing the design-build entity's detailed specification designed using first overlay 508, and a third overlay 512 representing instructions to the materials supplier. The operation of design system 500 will be further described with reference to FIG. 6.

Figure 6:
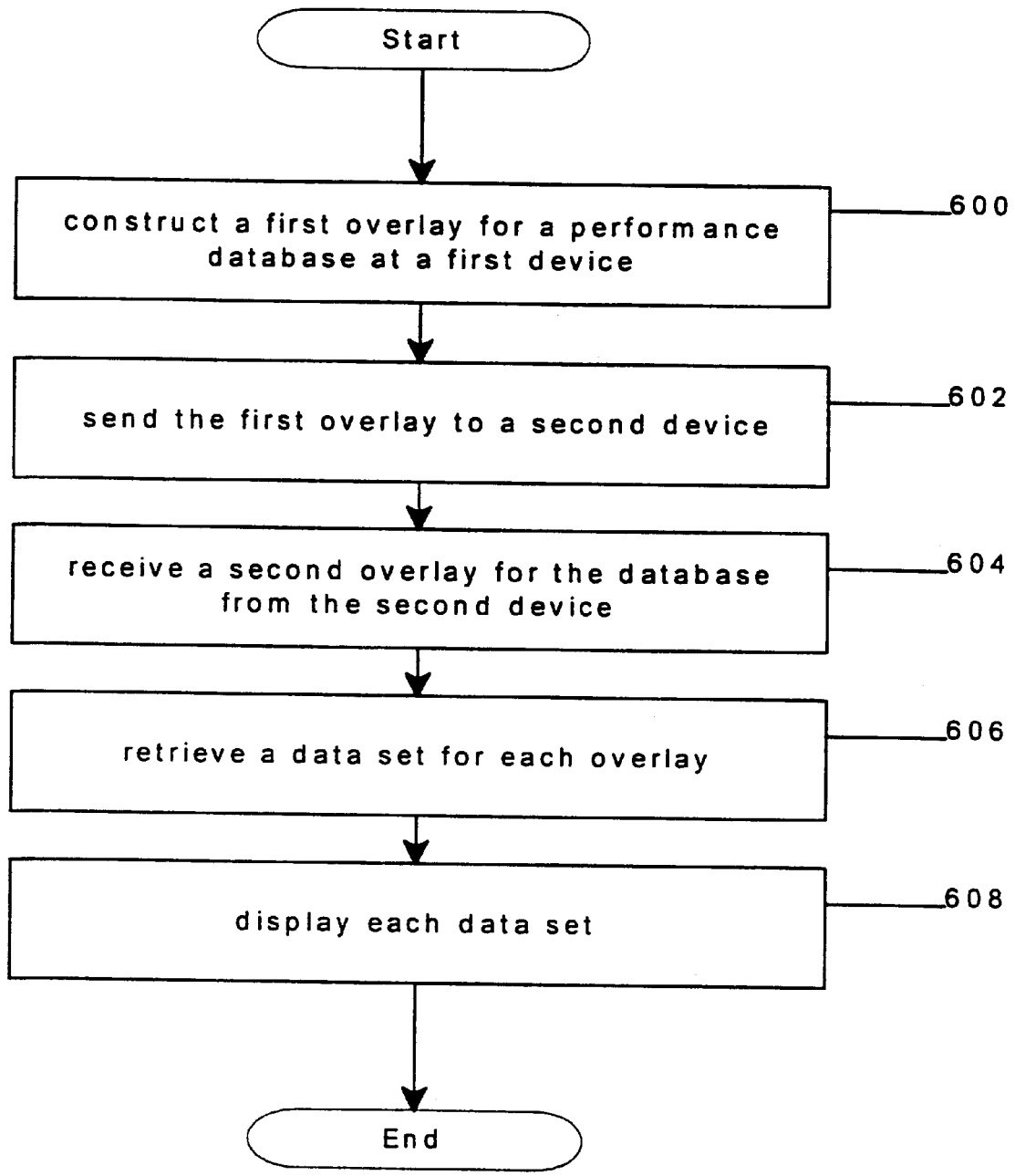
FIG. 6 is a block flow diagram of the steps performed by a design system in accordance with one embodiment of the invention.

FIG. 6 is a block flow diagram of the steps performed by a design system in accordance with one embodiment of the invention. As shown in FIG. 6, an owner entity constructs first overlay 508 for a performance database using system 502 at step 600. First overlay 508 is sent to system 506 via network 504 at step 602. System 502 receives second overlay 510, which in this embodiment of the invention has been constructed by the design-build entity using system 506. System 502 retrieves the underlying data in accordance with the first and second overlays at step 606, and displays (e.g., using monitor 126) each data set for review by the owner entity at step 608.

At step 600, system 502 constructs first overlay 600 by first receiving a selection for at least one first product element. The first product element could be a substructure, foundation, basement, and so forth. A performance value is received for the first product element. The performance value may be a qualitative or quantitative parameter as described previously. For example, the performance value may be that the foundation must be able to support the building without settling for 50 years. A representation for the first product element, or alternatively the product element data itself, and the associated performance values are then stored in electronic form.

Second overlay 510 is constructed as follows. System 506 receives first overlay 508 from network 504. System 506 uses first overlay 508 to extract data from database 128, including any product elements and their associated performance values. Using the product elements, a design-build entity can use system 506 to build upon the work accomplished by the owner entity which is represented by the first overlay, by retrieving one or more second product elements that comprise a portion of the first product element (e.g., are linked to the first product element) and which are consistent with the associated performance values. For example, if the first product element was a foundation capable of supporting a certain weight, a design-build entity could use system 506 to select from among different types of foundations, such as standard foundations, other foundations, or slabs on grade, that are capable of sustaining the requisite weight. In addition, the global switch may be used to convert the text fragments associated with the first product elements to convert the text to language appropriate for the design-build specification. A second representative for the selected second product elements, or the second product elements data, is then stored in electronic form along with the first overlay and performance values.

In addition to displaying the data sets for the first and second overlay, this embodiment of the invention also compares the data sets to ensure each of the first product elements and performance values include a corresponding second product element. That is, if a certain performance requirement has not been given any treatment by the design-build entity, e.g., no second product elements were selected to more specifically define the first product elements; then system 502 will indicate the lack of treatment for the owner-entity to factor into his or her evaluation of the second overlay data set.

Once the owner-entity accepts the design-build specification represented by the second overlay, which may take several iterations of transferring the first and second overlays between systems 502 and 506, a third overlay is constructed for the materials supplier entity. The global switch is used to convert the language from language appropriate for the design-build entity to language appropriate to the materials supplier entity. The converted information is stored in electronic form, and sent to the materials supplier entity or materials supplier entity system. In the latter case, the materials supplier entity system could retrieve a third set of data from database 128 corresponding to the third overlay, and display the third set of data for use by the materials supplier entity.

Figure 7:
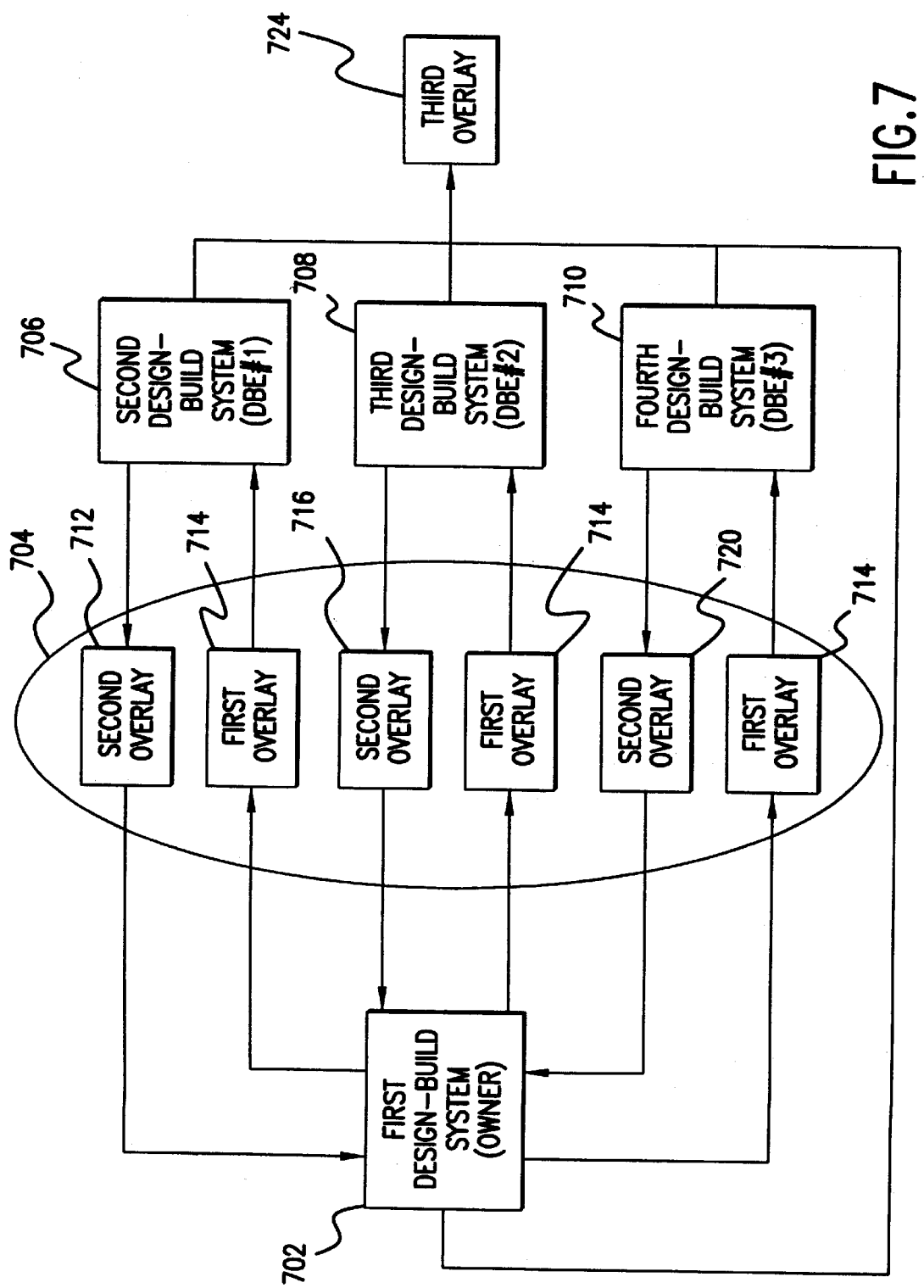
FIG. 7 is a block diagram of a design system having multiple design-build entities in accordance with one embodiment of the invention.

FIG. 7 is a block diagram of a design system having multiple design-build entities in accordance with one embodiment of the invention. As shown in FIG. 7, a first design-build system 702 is in communication with a second design-build system 706, a third design-build system 708 and a fourth design-build system 710, via network 704. The owner entity using system 702 constructs a first overlay 714 and sends it to systems 706, 708 and 710. Systems 706, 708 and 710 each send back second overlays 712, 716 and 720, respectively. Data sets corresponding to second overlays 712, 716 and 720 are retrieved by system 702, compared to ensure at least one second product element corresponds with each first product element of first overlay 718, and displayed. Each data set for the first overlay is compared to the second overlay to determine whether any of the second overlays did not include the selection of a second product element to further define a first product element represented in the first overlay. Further, the first data set and second data sets are arranged such that each performance requirement set forth in the RFP is aligned with its corresponding response in each design-build specification, thereby allowing the owner entity to conveniently compare the multiple responses.

Although various embodiments are specifically illustrated and described herein, it will be appreciated that modifications and variations of the present invention are covered by the above teachings and within the purview of the appended claims without departing from the spirit and intended scope of the invention. For example, although information is passed between design-build systems using a network 104, it can be appreciated that information could also be passed between systems in more conventional methods using optical or magnetic storage media, and still fall within the scope of the invention. Further, although the design elements used in describing various embodiments of the invention were in terms of performance requirements used in the design and construction of a building, it can be appreciated that the product elements can describe any product for any industry and still remain within the scope of the invention.

What is claimed is:

1. A method for defining a product to be produced by a builder, comprising:

constructing a first overlay for a performance database at a first device, said first overlay pointing to addresses within said database;

sending said first overlay to a second device;

receiving a second overlay for said database from said second device, said second overlay comprising a modified version of said first overlay;

retrieving a first set of data from said database corresponding to said first overlay, and a second set of data from said database corresponding to said second overlay; and displaying said first and second sets of data.

2. The method of claim 1, wherein said constructing comprises:

receiving a selection for at least a first product element from a first set of product elements;

receiving at least one performance value for said first product element; and storing a first representative for said first product element and said performance value in electronic form.

3. The method of claim 2, wherein said receiving said second overlay comprises:

receiving said first overlay at said second device;

constructing said second overlay using said first overlay; and sending said second overlay to said first device.

4. The method of claim 3, wherein constructing said second overlay comprises:

retrieving said first product element and said performance value from said first overlay;

retrieving at least one second product element from a second set of product elements, said second product element comprising a portion of said first product element and consistent with said performance value; and storing said first representative and performance value with a second representative for said second product element in electronic form.

5. The method of claim 4, further comprising:

comparing said first and second sets of data to ensure each of said first product elements includes a corresponding second product element; and indicating each of said first product elements not having a corresponding second product element.

6. The method of claim 1, further comprising:

constructing a third overlay;

sending said third overlay to a third device;

retrieving a third set of data from said database corresponding to said third overlay; and displaying said third set of data.

7. The method of claim 6, further comprising:

receiving a fourth overlay at said first device;

retrieving a fourth set of data from said database corresponding to said fourth overlay;

comparing said first and fourth sets of data to ensure each of said first product elements includes a corresponding second product element;

indicating each of said first product elements not having a corresponding second product element; and displaying said first, second and fourth sets of data.

8. A method for producing a specification document for a product using a database of product elements arranged in a hierarchical manner, comprising:

receiving a selection for at least one product element;

receiving at least one performance value associated with said selected product element;

retrieving a text segment associated with each selected product element;

receiving a selection for at least one of said retrieved text segments;

constructing the document from said selected text segments and formatting the document according to global variables relating to data in said database.

9. A computer-readable medium whose contents cause a computer system to assist in defining a product to be produced by a builder, the computer system having a design program and a relational database management program that when executed performs:

constructing a first overlay for a performance database at a first device, said first overlay pointing to addresses within said database;

sending said first overlay to a second device;

receiving a second overlay for said database from said second device, said second overlay comprising a modified version of said first overlay;

retrieving a first set of data from said database corresponding to said first overlay, and a second set of data from said database corresponding to said second overlay; and displaying said first and second sets of data.

10. The computer-readable medium of claim 9, wherein said constructing performs:

receiving a selection for at least a first product element from a first set of product elements;

receiving at least one performance value for said first product element; and storing a first representative for said first product element and said performance value in electronic form.

11. The computer-readable medium of claim 10, wherein said receiving said second overlay performs:

receiving said first overlay at said second device;

constructing said second overlay using said first overlay; and sending said second overlay to said first device.

12. The computer-readable medium of claim 11, wherein said constructing said second overlay performs:

retrieving said first product element and said performance value from said first overlay;

retrieving at least one second product element from a second set of product elements, said second product element comprising a portion of said first product element and consistent with said performance value; and storing said first representative and performance value with a second representative for said second product element in electronic form.

13. The computer-readable medium of claim 12, further performing the steps of:

comparing said first and second sets of data to ensure each of said first product elements includes a corresponding second product element; and indicating each of said first product elements not having a corresponding second product element.

14. The computer-readable medium of claim 9, further performing the steps of:

constructing a third overlay;

sending said third overlay to a third device;

retrieving a third set of data from said database corresponding to said third overlay; and displaying said third set of data.

15. The computer-readable medium of claim 14, further performs:

receiving a fourth overlay at said first device;

retrieving a fourth set of data from said database corresponding to said fourth overlay;

comparing said first and fourth sets of data to ensure each of said first product elements includes a corresponding second product element;

indicating each of said first product elements not having a corresponding second product element; and displaying said first, second and fourth sets of data.

16. A computer-readable medium whose contents cause a computer system to assist in producing a specification document for a product using a database of product elements arranged in a hierarchical manner, and the computer system having a design program and a relational database management program that when executed performs:

receiving a selection for at least one product element;

receiving at least one performance value associated with said selected product element;

retrieving a text segment associated with each selected product element;

receiving a selection for at least one of said retrieved text segments;

constructing the document from said selected text segments; and formatting the document according to global variables relating to data in said database.

17. An apparatus for producing a design document, comprising:

a relational database having product elements arranged in a hierarchical manner, with said product elements having associated performance values and text segments;

a relational database management system in communication with said relational database;

a design module in communication with said relational database and said relational database management system, said design module producing the design document using preselected performance values and text segments; and a formatting module in communication with said relational database and said relational database management system, said formatting module formats the design document using global variables that relate to data in said relational database.

18. A method for developing a request for proposal by an owner, and a responding proposal by a design builder for design and construction of a product, comprising:

defining a requirements file for said request for proposal including a performance specification and a prescriptive specification by selecting product descriptors from an owner database;

combining said requirements file with owner information to produce said request for proposal by selecting pre-written text segments from said owner database;

electronically linking attachments to said requirements file;

sending said request for proposal with said attachments as a first overlay to a design builder;

opening and reading said first overlay with reference to a proposer database correlating to said owner database;

preparing a responding proposal from said design builder by adding detailed product descriptors selected from said proposer database to said first overlay and producing a second overlay;

attaching proposer information and a cost statement to said second overlay;

sending said second overlay from said design builder to said owner; and producing an electronic comparison file by comparing said first overlay and said second overlay.

19. The method of claim 18, wherein said defining comprises:

modifying a text segment associated with each selected product element;

adding additional text segments not contained in said owner database; and constructing said request for proposal from said additional text segments.

20. The method of claim 18, wherein said defining comprises:

selecting at least one first product element from a first set of product elements on said owner database;

selecting from said owner database at least one performance value for said at least one first product element;

customizing said at least one product element and said at least one performance value by adding and subtracting text; and storing a first representative for said customized at least one product element and said customized at least one performance value in electronic form.

21. The method of claim 20, wherein said preparing comprises:

retrieving said at least one first product element and said at least one performance value from said first overlay;

selecting at least one second product element from a second set of product element, said at least one second product element comprising a portion of said at least one first product element and consistent with said at least one performance value; and storing said first representative and said at least one performance value with a second representative for said at least one second product element in electronic form.

22. The method of claim 21, further comprising:

comparing said first and second sets of product elements to ensure each of said first set of product elements includes a corresponding each of said second set of product elements; and indicating each of said first set of product elements not having a corresponding each of said second set of product elements.

23. The method of claim 18, wherein said preparing further comprises:

sending said second overlay to a third device of a supplier of materials for said product;

selecting at said third device a third set of data from a supplier database correlating to said proposer database;

constructing a third overlay by adding detailed product descriptors from said supplier database; and sending said third overlay to said second device.

24. The method of claim 23, wherein said preparing further comprises:

receiving said third overlay at said second device;

retrieving a third set of product elements from said third overlay;

comparing said second set of product elements to said third set of product elements to ensure each of said second set of product elements includes a corresponding each of said third set of product elements;

incorporating said third set of product elements into said second overlay.

25. The method of claim 18, wherein said preparing comprises:

receiving said first overlay; and constructing said second overlay using said first overlay.

26. A computer-readable medium whose contents cause a computer system to assist in preparing a request for proposal and a responding proposal for a product using a database of product descriptors having product elements arranged in a hierarchical manner and the computer system having a design program and a relational database management program that when executed allows a user to perform:

selecting at least one product element;

selecting at least one performance value associated with said selected product element;

modifying a text segment associated with each selected product element;

adding text segments not contained in said database;

constructing said request for proposal from said at least one product element and said modified text segment, and said added text segments.

27. An apparatus for producing a request for proposal and a responding proposal, comprising:

a relational database having product elements arranged in a hierarchical manner, with said product elements having associated user-selected performance values, prescriptive specifications, and text segments;

a relational database management system in communication with said relational database; and a formatting module in communication with said relational database and said relational database management system, said formatting module assembles and formats the request for proposal and the responding proposal from said performance values, said prescriptive specifications, and said text segments.

* * * * *